Dec. 23, 1941.                A. L. PARKER                    2,266,795
              APPARATUS FOR PREPARING FLARED END TUBES
                  Filed April 29, 1938          3 Sheets-Sheet 1
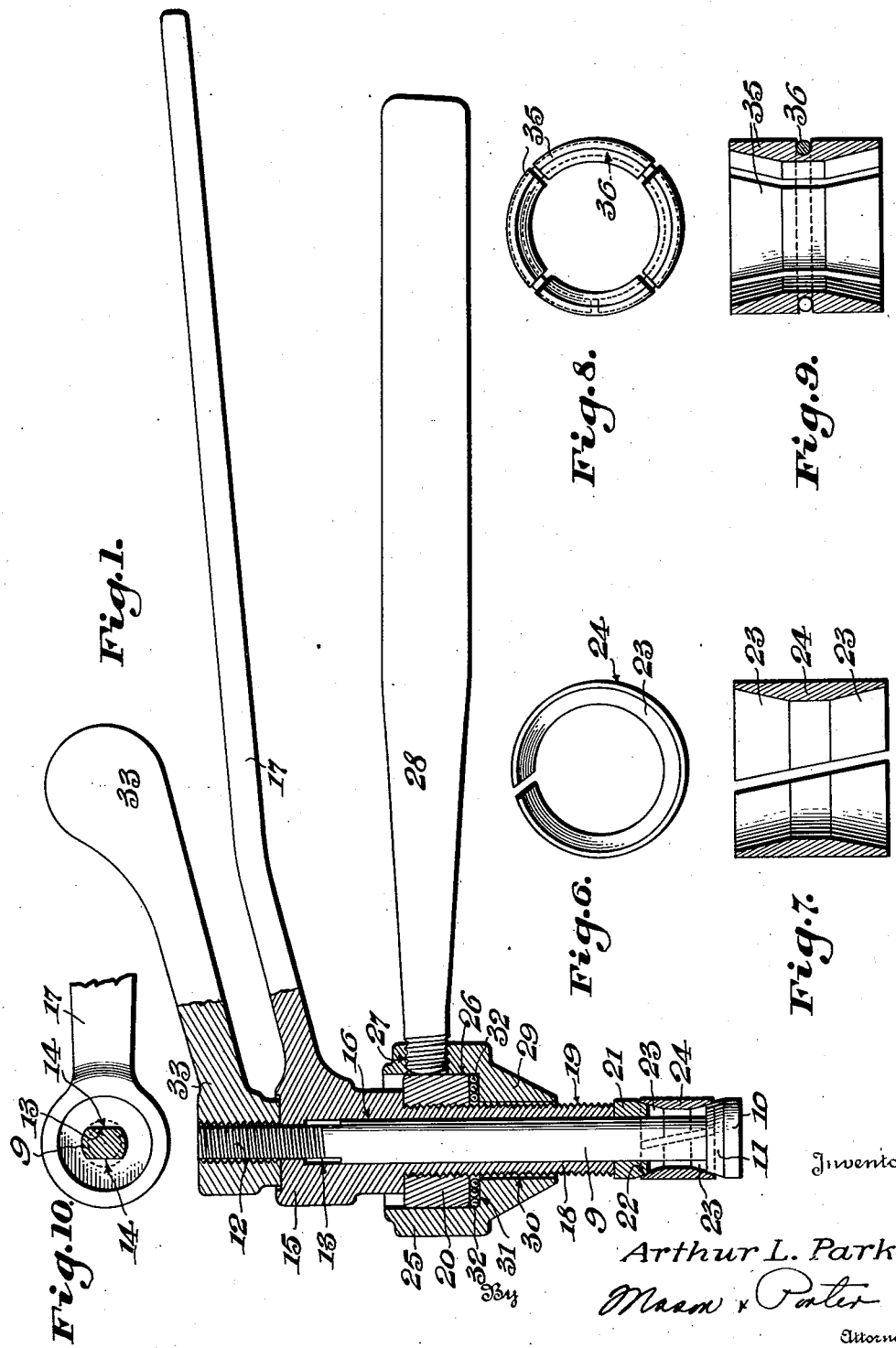
Inventor
Arthur L. Parker
By Mason & Porter
Attorneys Dec. 23, 1941.  A. L. PARKER  2,266,795
APPARATUS FOR PREPARING FLARED END TUBES
Filed April 29, 1938  3 Sheets-Sheet 2
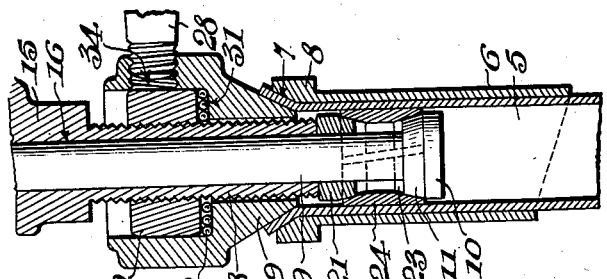
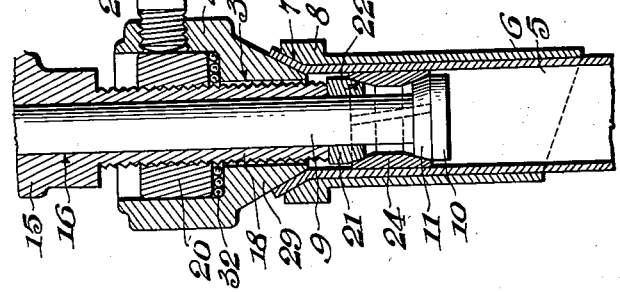
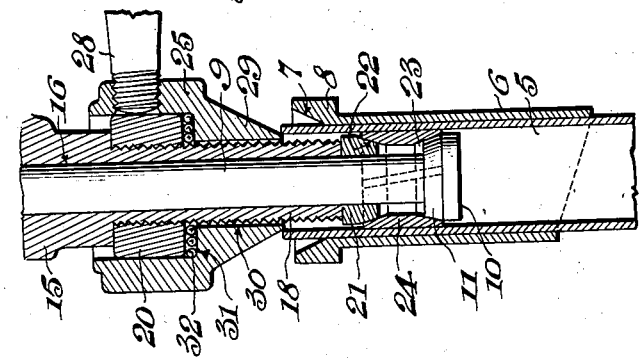
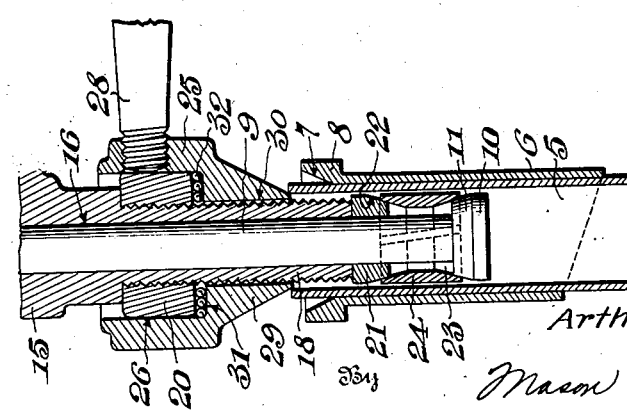
Inventor
Arthur L. Parker
Mason & Porter
Attorneys Dec. 23, 1941.  A. L. PARKER  2,266,795
APPARATUS FOR PREPARING FLARED END TUBES
Filed April 29, 1938   3 Sheets-Sheet 3
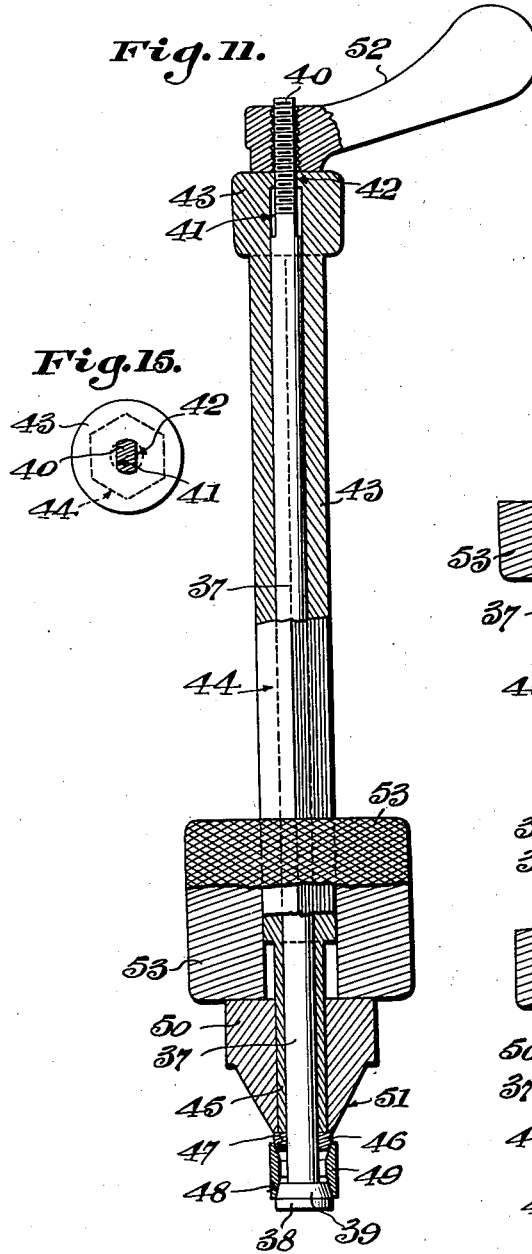
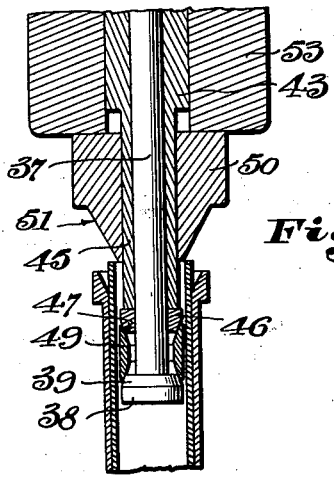
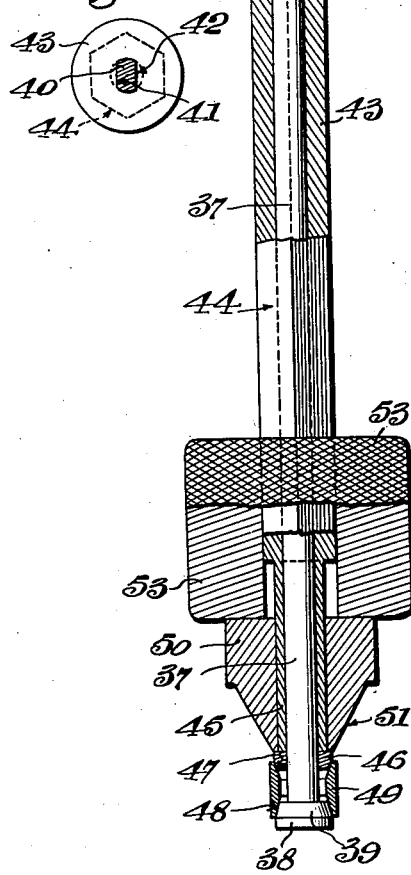
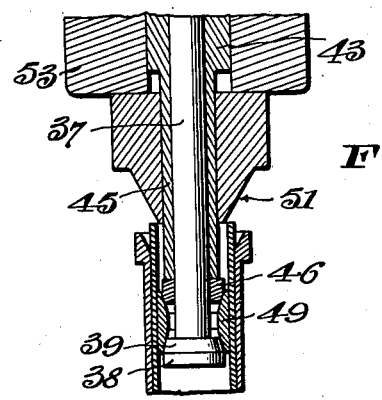
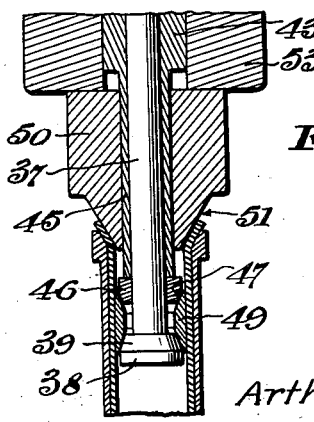
Inventor
Arthur L. Parker
By Mason & Porter
Attorneys Patented Dec. 23, 1941

2,266,795

UNITED STATES PATENT OFFICE 2,266,795

APPARATUS FOR PREPARING FLARED END TUBES

Arthur L. Parker, Cleveland, Ohio

Application April 29, 1938, Serial No. 205,102

7 Claims. (Cl. 153—79)

The invention relates generally to tube couplings and has for an object to provide a novel apparatus for securing the tubes to be coupled in the sleeves which surround and protect them and serve in part to clamp them in place in the complete couplings, and for flaring the tube ends preparatory to the formation of said couplings.

In the formation of certain forms of tube couplings, of which my prior Patent 1,893,442, issued January 3, 1933, forms an example, it is customary to provide the tubes with flared ends and to clamp said ends between opposing coniform male and female clamping surfaces, the latter of which are formed in sleeves which snugly surround the tubes to protect them from damaging vibration and which include shoulders engaged by nuts adjustable along the axis of the tubes and sleeves to seat the sleeves in clamping engagement with the flared tube and the opposing male clamping surface. When any appreciable clearance is permitted between the sleeves and the tube portions which they surround, vibration of the coupled tubes is permitted and breakage often results. In my present invention, I seek to remedy these evils by providing a novel apparatus for first expanding a tube end within its protective sleeve to engage them in permanent intimate wall-to-wall contact, and for then flaring the end portion of the tube against an opposed clamping surface of the protective sleeve.

Another object of the invention is to provide a novel tube expanding and flaring tool including an expanding chuck or collet insertible into the end of the tube and its surrounding sleeve, and a coniform flaring head movable longitudinally relative to said chuck and engageable in the end of said tube.

Another object of the invention is to provide a novel tube expanding chuck equipment.

Another object of the invention is to provide rotatable means for imparting longitudinal movement to the flaring head.

Another object of the invention is to provide a novel tube expanding and flaring tool including a novel means for imparting hammer blows to the flaring head for moving it in flaring engagement with the tube end.

With the above and other objects in view that will hereinafter appear, the nature of the invention will be more clearly understood by following the detailed description, the appended claims, and the several views illustrated in the accompanying drawings.

In the drawings,

Figure 1 is a detailed vertical section of one form of tube expanding and flaring apparatus, parts being shown in elevation and the section being taken through the axis of the expanding and flaring devices.

Figure 2 is a fragmentary, somewhat diagrammatic, sectional view of a portion of the apparatus, the tube expanding devices being inserted freely in the end of the tube which is to be expanded and flared.

Figure 3 is a view similar to Figure 2 and illustrates the expanded condition of the parts.

Figure 4 is a view similar to Figures 2 and 3 and illustrates the completion of the step of flaring the expanded and clamped tube.

Figure 5 is a view similar to Figure 4 and illustrates the flaring head released for movement independent of the adjusting nut.

Figures 6 and 7 are detailed vertical section and plan views illustrating the expanding sleeve.

Figures 8 and 9 are views similar to Figures 6 and 7 and illustrate a modified form of expanding sleeve.

Figure 10 is a plan view of the tool head.

Figure 11 is an axial longitudinal section of a modified form of tube expanding and flaring apparatus, parts being shown in elevation.

Figure 12 is a fragmentary sectional view illustrating the expanding chuck inserted freely into the end of the tube to be expanded and flared.

Figure 13 is a view similar to Figure 12, the expanding chuck functioning to expand the tube into intimate contact with the surrounding sleeve.

Figure 14 is a view similar to Figure 13 and illustrates the function of flaring the tube end.

Figure 15 is a detail end view of the slide guide sleeve.

In the drawings, I have illustrated a tube 5 which is to have its end flared preparatory to coupling. It is customary to surround such tubes with protective sleeves, one of which is indicated at 6. These sleeves surround the tubes and are flared at their ends as at 7 to form a clamping surface for engaging the external flare of the tube end. Each sleeve includes a clamping shoulder 8 engageable, in the completed coupling, by a nut adjustable axially with respect to the tube and sleeve for moving the flared end 7 of the sleeve and the flared end of the tube against a male clamping surface provided in the coupling. In practicing the invention, a sleeve 6 is slipped over the end of a tube 5, the tube is then expanded to engage the sleeve in permanent, intimate wall-to-wall contact so as to eliminate all space which would permit the tube to vibrate independently of its protective sleeve, and the end of the tube is then flared by use of novel apparatus soon to be described.

In Figures 1 through 7 of the drawings, I have illustrated one form of apparatus embodying my invention. In this apparatus is included a longitudinal rod 9 equipped with a head 10 at its lower end, said head including a tapered side wall portion 11. The upper end of the rod is externally threaded as at 12 and includes a flattened portion 13 engageable with a similarly flattened portion 14 in a head 15 having a bore 16 for freely receiving the rod 9. The head includes a handle extension 17 and a depending sleeve extension 18 which surrounds the rod 9 and is externally threaded as at 19.

An externally knurled nut 20 is adjustably mounted on the threaded sleeve 18 and, at its lower end, the sleeve abuts a spreader 21 slidable along the rod 9 for cooperation with the head 10 and including a tapered wall portion 22. The tapered wall portions 22 and 11 of the spaced elements 21 and 10 engage in flared ends 23 of a split collet or chuck sleeve 24 for a purpose soon to be described.

A flaring head 25 surrounds the nut 20 and sleeve 18 and includes a counterbore 26, to freely receive said nut, and a laterally threaded bore 27 for adjustably receiving the threaded end of a handle member 28. It will be observed that the bore 27 extends through the wall of the head 25 so that the threaded end of the handle can be projected, set screw fashion, into the counterbore 26 for clamping engagement with the nut 20. The head 25 includes a depending coniform flaring portion 29 including a bore 30 for freely surrounding the threaded sleeve 18, and an abutment shoulder 31 opposed to the lower surface of the nut 20. Ball bearings 32 are interposed between the abutment shoulder 31 and the opposed surface of the nut.

A handle member 33 is threaded onto the upper end of the rod 9 and engages the head 15 so that when the member 33 is turned about the axis of the rod it will serve to move the rod longitudinally within the head 15 and sleeve 18, said rod being held against rotative movement by the flattened surfaces 13 and 14.

The manner of using the apparatus above described is illustrated in the somewhat diagrammatic Figures 2, 3, 4 and 5. In Figure 2 a tube 5 to be flared is properly mounted in its cooperating protective sleeve 6 and the expanding chuck 24 is inserted into the end of the tube.

In Figure 3 the expanded condition of the tube is illustrated. In other words, the chuck has been expanded to enlarge the wall portion of the tube and force it into permanent, intimate wall-to-wall contact with the surrounding sleeve 6. This is accomplished by turning the handle member 33 about the axis of the rod 9, causing the rod to move longitudinally in the sleeve 18 and force the elements 10 and 21 toward each other to spread and expand the chuck sleeve 24 and accomplish the tube expansion just described. By turning the handle member 28 about its axis so as to cause the threaded end thereof to tightly grip the nut 20, and by then turning the handle member about the axis of the rod 9, the nut 20 will be made to force the head 25 and the flaring portion 29 downwardly into the end of the tube 5 to flare the same. The completion of the flaring function is shown in Figure 4 of the drawings. The downward movement of the flaring head 29 can be effected by completely rotating the handle member 28 about the axis of the rod 9 while holding the handle members 33 and 17 stationary, or the handle member 28 can be moved in a partial rotation, then unscrewed slightly to relieve the clamped condition of the nut and rotated partially in the reverse direction, and then reclamped and rotated again in the first stated direction in successive cycles so as to seat the flaring portion step by step if desired.

After the expansion and flaring of the tube has been completed as shown in Figure 4 of the drawings, the handle member 28 can be turned to free the clamped relation of the end thereof with the nut 20, as indicated at 34 in Figure 5, thus freeing the head 25, 29 for rotation about the nut without imparting movement thereto. With the parts thus adjusted, it is possible to rotate the head portion 29 within the flared end of the tube to burnish the flared surface of the tube intended to engage the male seat in the finished coupling.

In Figures 6 and 7 of the drawings, I have illustrated the detailed construction of the chuck sleeve shown in Figure 1, and in Figures 8 and 9 of the drawings I have illustrated a modified form of chuck sleeve composed of independent sections 35 separated by longitudinal splits and yieldably held together by a ring 36 seated in a central groove formed in the external surfaces of the sections.

In Figures 11 to 15, I have illustrated a modified form of tube expanding and flaring tool in which is included a longitudinal rod 37 equipped at one end with a head 38 having tapered side wall portions 39. At its upper end the rod is externally threaded as at 40 and includes a flattened portion 41 for engagement with a similarly flattened portion 42 formed in the end of the slide guide and chuck actuator sleeve 43.

The main body portion of the sleeve 43 is hexagonal or non-circular at its outer surface, as indicated at 44, and includes a reduced end portion 45 engageable with a spreader member 46 slidable along the rod 37 in cooperative spaced relation with the head 38 of the rod. The spreader 36 includes a tapered wall portion 47 for cooperating with the tapered wall portion 39 in engaging in the flared ends 48 of and spreading the split chuck sleeve 49.

A flaring head 50 is slidably mounted on the reduced extension 45 of the sleeve 43 and includes a coniform flaring portion 51 engageable in the end of the tube clamped by the chuck for the purpose of flaring the same.

A rod moving handle 52 is threaded on the threaded end 40 of the rod, and a heavy slide or hammer block 53 is slidably mounted on the non-circular exterior 44 of the sleeve 43.

In this form of the invention the chuck is inserted in the end of the sleeve surrounded tube, as shown in Figure 12, after which the handle member 52 is manipulated to draw the rod 37 longitudinally in the sleeve 43 and cause expansion of the chuck sleeve 49, as shown in Figure 13 of the drawings, for the purpose of expanding the tube into intimate contact with its surrounding sleeve.

After the tube is thus expanded and clamped, the hammer block 53 is rapidly slid back and forth along the sleeve 43 to impart hammer blows to the head 50, 51 and force the coniform portion 51 into the tube for flaring it in the manner shown in Figure 14.

In the foregoing description I have disclosed novel apparatus by which a tube to be coupled is expanded into permanent, intimate wall-to-wall contact with its surrounding protective sleeve and then flared to prepare it for ultimate coupling. The details of construction and the advantages of the apparatus will be readily understood by those skilled in the art to which the invention relates.

I claim:

1. A tube end flaring tool comprising, a rod having an abutment head at one end and externally threaded at its other end, an abutment sleeve slidable on said rod and opposed to the abutment head, a chuck sleeve engaged at its respective ends by said abutment members and expansible upon reduction of spaced relation of said abutment members to grip in and hold a tube to be flared, a head freely surrounding said rod and including a depending externally threaded sleeve abutting said abutment sleeve, means threadable on said threaded rod end for forcing the sleeves along said rod to reduce the abutment member spacing, and means threadable along said threaded sleeve and including a flaring head engageable in the end of a tube held by the chuck for flaring said tube end.

2. A tube end flaring tool comprising, a rod having an abutment head at one end and externally threaded at its other end, an abutment sleeve slidable on said rod and opposed to the abutment head, a chuck sleeve engaged at its respective ends by said abutment members and expansible upon reduction of spaced relation of said abutment members to grip in and hold a tube to be flared, a head freely surrounding said rod and including a depending externally threaded sleeve abutting said abutment sleeve, means threadable on said threaded rod end for forcing the sleeves along said rod to reduce the abutment member spacing, a flaring head including a coniform extension freely movable along said threaded sleeve for engagement in the end of a tube held by the chuck, and a nut threadable along the threaded sleeve and engaging said flaring head.

3. A tube end flaring tool comprising, a rod having an abutment head at one end and externally threaded at its other end, an abutment sleeve slidable on said rod and opposed to the abutment head, a chuck sleeve engaged at its respective ends by said abutment members and expansible upon reduction of spaced relation of said abutment members to grip in and hold a tube to be flared, a head freely surrounding said rod and including a depending externally threaded sleeve abutting said abutment sleeve, means threadable on said threaded rod end for forcing the sleeves along said rod to reduce the abutment member spacing, a flaring head including a coniform extension freely movable along said threaded sleeve for engagement in the end of a tube held by the chuck, a nut threadable along the threaded sleeve and engaging said flaring head, and antifriction bearings between said nut and said flaring head.

4. A tube end flaring tool comprising, a rod having an abutment head at one end and externally threaded at its other end, an abutment sleeve slidable on said rod and opposed to the abutment head, a chuck sleeve engaged at its respective ends by said abutment members and expansible upon reduction of spaced relation of said abutment members to grip in and hold a tube to be flared, a head freely surrounding said rod and including a depending externally threaded sleeve abutting said abutment sleeve, means threadable on said threaded rod end for forcing the sleeves along said rod to reduce the abutment member spacing, a flaring head including a coniform extension freely movable along said threaded sleeve for engagement in the end of a tube held by the chuck, a nut threadable along the threaded sleeve and engaging said flaring head, and means for at times securing said nut and said flaring head to move in unison and adjustable to permit said flaring head to be moved independently of said nut.

5. A tube end flaring tool comprising, a rod having an abutment head at one end and externally threaded at its other end, an abutment sleeve slidable on said rod and opposed to the abutment head, a chuck sleeve engaged at its respective ends by said abutment members and expansible upon reduction of spaced relation of said abutment members to grip in and hold a tube to be flared, a head freely surrounding said rod and including a depending externally threaded sleeve abutting said abutment sleeve, means threadable on said threaded rod end for forcing the sleeves along said rod to reduce the abutment member spacing, a flaring head including a coniform extension freely movable along said threaded sleeve for engagement in the end of a tube held by the chuck, a nut threadable along the threaded sleeve and engaging said flaring head, and a handle member threadably mounted on said flaring head and engageable with the nut for securing the flaring head and nut to move in unison or releasable from nut engagement to permit movement of the flaring head independently of said nut.

6. A tube end flaring tool comprising, a rod having an abutment head at one end and externally threaded at its other end, an abutment sleeve slidable on said rod and opposed to the abutment head, a chuck sleeve engaged at its respective ends by said abutment members and expansible upon reduction of spaced relation of said abutment members to grip in and hold a tube to be flared, a head freely surrounding said rod and including a depending externally threaded sleeve abutting said abutment sleeve, means threadable on said threaded rod end for forcing the sleeves along said rod to reduce the abutment member spacing, a flaring head including a coniform extension freely movable along said threaded sleeve for engagement in the end of a tube held by the chuck, a nut threadable along the threaded sleeve and engaging said flaring head, a handle member threadably mounted on said flaring head and engageable with the nut for securing the flaring head and nut to move in unison or releasable from nut engagement to permit movement of the flaring head independently of said nut, a handle member projecting from said sleeve forcing means, and a handle member projecting from said externally threaded sleeve equipped head.

7. A tube flaring tool comprising a body member, a head movable along the body member and including a coniform tube flaring portion, and means carried by the body member and insertible into the end of a tube for securing the body member to the tube and centering the coniform portion relative to the end of the tube, and means for moving said head member along said body member to cause it to engage in and flare the end of the tube, said last named means including a single handle member selectively effective for imparting said longitudinal movement to said head and for imparting rotative movement only to said head after flaring of the tube to burnish the flared surface of the tube.

ARTHUR L. PARKER.